United States Patent
Akazawa

(10) Patent No.: US 12,307,655 B2
(45) Date of Patent: May 20, 2025

(54) CELL IMAGE ANALYSIS METHOD AND CELL IMAGE ANALYSIS DEVICE

(71) Applicant: Shimadzu Corporation, Kyoto (JP)

(72) Inventor: Ayako Akazawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/035,042

(22) Filed: Sep. 28, 2020

(65) Prior Publication Data

US 2021/0110536 A1 Apr. 15, 2021

(30) Foreign Application Priority Data

Oct. 11, 2019 (JP) .............................. JP2019-187865

(51) Int. Cl.
*G06T 7/00* (2017.01)
*G01N 15/14* (2006.01)
(Continued)

(52) U.S. Cl.
CPC ....... *G06T 7/0012* (2013.01); *G01N 15/1429* (2013.01); *G01N 15/1433* (2024.01);
(Continued)

(58) Field of Classification Search
CPC ......... G06T 7/0012; G06T 7/11; G06T 7/136; G06T 2207/10056; G06T 2207/20081;
(Continued)

(56) References Cited

U.S. PATENT DOCUMENTS

2017/0213357 A1* 7/2017 Hishida .............. G01N 21/8851
2017/0276598 A1 9/2017 Ikuyama
(Continued)

FOREIGN PATENT DOCUMENTS

JP 2014-18184 A 2/2014
JP 2016-511419 A 4/2016
(Continued)

OTHER PUBLICATIONS

Held, Christian, et al. "Comparison of parameter-adapted segmentation methods for fluorescence micrographs." Cytometry Part A 79.11 (2011): 933-945.https://onlinelibrary.wiley.com/doi/full/10.1002/cyto.a.21122 (Year: 2011).*

(Continued)

*Primary Examiner* — John Villecco
*Assistant Examiner* — Han Hoang
(74) *Attorney, Agent, or Firm* — Muir Patent Law, PLLC

(57) ABSTRACT

A shape of a cell is favorably observed in a non-invasive manner. One aspect of a cell analysis device according to the present invention includes: holographic microscopy, an image generation unit configured to generate a phase image of a cell based on hologram data acquired by observing the cell with the holographic microscopy, a first machine learning model storage unit configured to store a cell area machine learning model generated by performing machine learning using training data in which a phase image of a cell generated based on the hologram data is used as an input image and a pseudo cell area image based on a stained image acquired by staining a cytoskeleton corresponding to the phase image is regarded as a ground truth image, and a cell area estimation unit configured to output a cell area estimation image indicating a cell area using a machine learning model stored in the first machine learning model storage unit, wherein the phase image generated by the image generation unit for the analysis target cell is used as an input image.

14 Claims, 12 Drawing Sheets

(51) Int. Cl.

| | |
|---|---|
| *G01N 15/1429* | (2024.01) |
| *G01N 15/1433* | (2024.01) |
| *G06T 7/11* | (2017.01) |
| *G06T 7/136* | (2017.01) |
| *G01N 15/01* | (2024.01) |
| *G01N 15/10* | (2006.01) |
| *G01N 15/1434* | (2024.01) |

(52) U.S. Cl.
CPC ............ *G01N 15/1468* (2013.01); *G06T 7/11* (2017.01); *G06T 7/136* (2017.01); *G01N 15/01* (2024.01); *G01N 2015/1006* (2013.01); *G01N 2015/1454* (2013.01); *G01N 2015/1477* (2013.01); *G06T 2207/10056* (2013.01); *G06T 2207/20081* (2013.01); *G06T 2207/30024* (2013.01); *G06T 2207/30104* (2013.01)

(58) Field of Classification Search
CPC . G06T 2207/30024; G06T 2207/30104; G06T 2207/20084; G06T 7/194; G01N 15/1429; G01N 15/1463; G01N 15/1468; G01N 2015/0065; G01N 2015/1006; G01N 2015/1454; G01N 2015/1477; G01N 15/1434; G01N 2015/1497; G01N 15/1475; G01N 21/6402; G01N 21/6486; C12M 41/36; C12Q 1/02
See application file for complete search history.

(56) References Cited

U.S. PATENT DOCUMENTS

| | | | |
|---|---|---|---|
| 2018/0032787 A1 | 2/2018 | Iga et al. | |
| 2018/0232879 A1 | 8/2018 | Chang et al. | |
| 2018/0292784 A1* | 10/2018 | Nguyen | ................. G02B 21/18 |
| 2018/0315190 A1 | 11/2018 | Sasagawa et al. | |
| 2019/0147215 A1* | 5/2019 | Al-Kofahi | ............. G06T 7/0012 |
| | | | 382/133 |
| 2019/0156481 A1* | 5/2019 | Sekiguchi | .............. G06V 10/56 |
| 2020/0072841 A1* | 3/2020 | Baur | .................... C12Q 1/6886 |
| 2021/0064845 A1* | 3/2021 | Stumpe | ................. G06V 20/695 |
| 2021/0073513 A1* | 3/2021 | Porto | ................... G06V 20/693 |
| 2022/0114819 A1* | 4/2022 | Ichihashi | ................ G06T 7/251 |

FOREIGN PATENT DOCUMENTS

| | | |
|---|---|---|
| JP | 2018-173273 A | 11/2018 |
| JP | 2018-185759 A | 11/2018 |
| JP | 2019-091307 A | 6/2019 |
| JP | 2019-095853 A | 6/2019 |
| JP | 2019-109710 A | 7/2019 |
| WO | 2014164757 A1 | 10/2014 |
| WO | 2016/042963 A1 | 3/2016 |
| WO | 2016/162945 A1 | 10/2016 |
| WO | 2019/171453 A1 | 9/2019 |

OTHER PUBLICATIONS

Notice of Reasons for Refusal, dated Jan. 17, 2023, for corresponding Japanese Patent Application No. 2019-187865, and machine translation thereof (10 pages).

Nishimura Kazuya, Outside Binary Name, "Cell Region Recognition in Two or More Cell Strains Using Weak Teacher Study", IEICE Technical Report, Japan, General Incorporated Foundation Institute of Electronics, Information and Communication Engineers, May 23, 2019, vol. 119, No. 64, pp. 271-275. and machine translation thereof (20 pages).

Afaf Tareef et al., "Multi-Pass Fast Watershed for Accurate Segmentation of Overlapping Cervical Cells", IEEE Transactions on Medical Imaging, Mar. 12, 2018, vol. 37, No. 9, pp. 2044-2059.

Decision of Refusal, dated May 30, 2023, issued by the Japanese Patent Office, for the corresponding Japanese Patent Application No. 2019-187865, and machine translation thereof.

Marina E. Plissiti et al. and "Watershed-based segmentation of cell nuclei boundaries in Pap smear images", Proceedings of the 10th IEEE International Conference on Information Technology and Applications in Biomedicine, IEEE, Nov. 3, 2010, pp. 1-4.

First Office Action dated Jan. 2, 2024, issued from the Chinese Patent Office, for the corresponding Chinese Patent Application No. 202010950840.X, and English-language machine translation of the same.

* cited by examiner

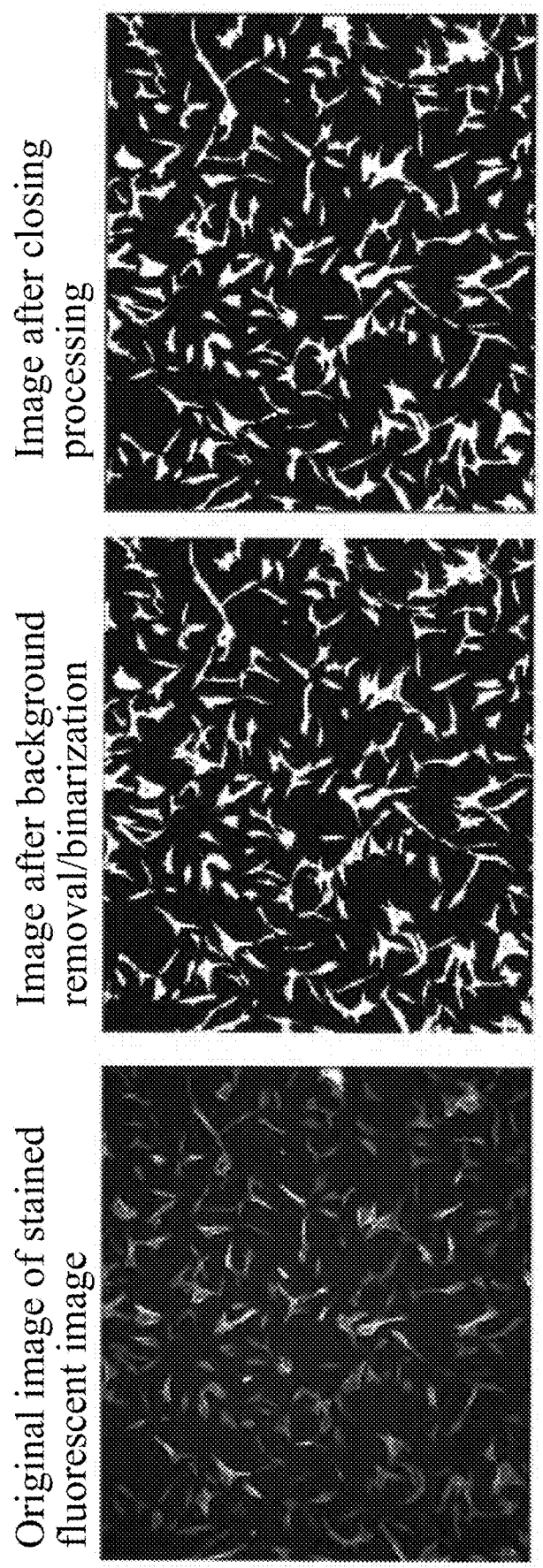
FIG. 7A Original image of stained fluorescent image
FIG. 7B Image after background removal/binarization
FIG. 7C Image after closing processing Input image (IHM phase image)

Output image (cell area estimation image)

Input image (IHM phase image)

Output image (cell position estimation image)

Cell shape estimation image

Cell area estimation result is overlaid on IHM phase image

IHM phase image

Nucleus position estimation result is overlaid on IHM phase image

Nucleus site estimation result

CELL IMAGE ANALYSIS METHOD AND CELL IMAGE ANALYSIS DEVICE

CROSS-REFERENCE TO RELATED APPLICATIONS

The present application claims priority under 35 U.S.C. 119 to Japanese Patent Application No. JP2019-187865 filed on Oct. 11, 2019, the contents of which are incorporated by reference in its entirety.

TECHNICAL FIELD

The present invention relates to a cell image analysis method for analyzing an observation image acquired for a cell and a cell analysis device using the method. More particularly, the present invention relates to a cell image analysis method and a cell analysis device suitable for observing a cell shape and evaluating a cell area.

BACKGROUND OF THE INVENTION

In a regenerative medicine field, in recent years, researches using a pluripotent stem cell, such as, e.g., an iPS cell, an ES cell, and a mesenchymal stem cell, have been actively conducted. In researching and developing regenerative medicine using such a pluripotent stem cell, a large number of undifferentiated cells maintaining pluripotency needs to be cultured. Therefore, it is necessary to select an appropriate culture environment and to stably control the environment, and it is also necessary to confirm the condition of cells in the culture at a high frequency. In a regenerative medicine field, it is essential to observe and confirm a cell status non-destructively and non-invasively in order to continuously culture the cells after observation. These non-destructive and non-invasive evaluations of the cell status are generally based on a morphological evaluation using a cell image acquired by a cell observation device.

Since a thin and transparent object, such as, e.g., a cell, generally absorbs less light, it is difficult to recognize the morphology of the object by an optical intensity image. Therefore, conventionally in general, a phase-contrast microscope has been widely used for observing cells. Since a phase-contrast microscope images an amount of change in phase which changes as light passes through an object, it is possible to acquire a phase-contrast image that also visualizes the morphology of a cell that is transparent. Patent Document 1 discloses a technique for distinguishing between a good cell colony consisting of undifferentiated cells and a bad cell colony containing undifferentiated deviation cells for a pluripotent stem cell based on a phase-contrast image acquired with such a phase-contrast microscope.

PRIOR ART DOCUMENT

Patent Document

Patent Document 1: Japanese Unexamined Patent Application Publication No. 2014-18184
Patent Document 2: International Patent Publication No. WO 2016/162945

SUMMARY OF THE INVENTION

Problems to be Solved by the Invention

A shape of a cell is one of the important factors in assessing whether or not the cell in culture is in a good condition. Further, a shape of a cell is also important to elucidate functions and/or characteristics of a cell. However, depending on the type of the cell and the state of the background (medium) of the cell, the cell membrane separating the inside and the outside of the cell cannot be clearly observed even in a phase-contrast image by a phase-contrast microscope, and the pixel value between the inside and the outside of the cell does not differ, and therefore there is a case that it is difficult to grasp the precise shape of the cell.

The present invention has been made in order to solve the above-described problems, and a main object thereof is to provide a cell image analysis method and a cell analysis device capable of satisfactorily observing a shape of a cell non-invasively.

Means for Solving the Problem

According to one aspect of a cell image analysis method according to the present invention made to solve the above-described problem, a cell image analysis method includes:
  a machine learning model generation step for generating a machine learning model by performing machine learning using training data including a phase image of a cell for an input image of the machine learning and a pseudo cell area image for a ground truth, the phase image being generated based on hologram data acquired by holographic microscopy, the pseudo cell area image corresponding to the phase image, the pseudo cell image being based on a stained image acquired by staining cytoskeletons; and
  an area estimation step for outputting a cell area estimation image indicating a cell area using the machine learning model, wherein a phase image for an analysis target cell is used as an input image.

Further, according to one aspect of a cell image analysis device according to the present invention made to solve the above-described problem, a cell analysis device includes:
  a holographic microscope;
  an image generation unit configured to generate a phase image of a cell based on hologram data acquired by observing the cell with the holographic microscope;
  a first machine learning model storage unit configured to store a cell area machine leaning model generated by performing machine learning using training data including a phase image of a cell for an input image and a pseudo cell area image for a ground truth image, the phase image being generated based on hologram data, the pseudo cell area image corresponding to the phase image, and the pseudo cell area image being based on a stained image acquired by staining cytoskeletons; and
  a cell area estimation unit configured to output a cell area estimation image indicating a cell area using a cell area machine learning model stored in the first machine learning model storage unit, wherein a phase image generated by the image generation unit for an analysis target cell is used as an input image.

The above-described holographic microscopy is typically digital holographic microscopy, and the above-described phase image is an image that is, for example, reconstructed based on the phase information acquired by the calculation processing based on the hologram data acquired by the digital holographic microscopy.

Effects of the Invention

There exist various cell organelles in cytoplasm, and a cytoskeleton is a structural element that is present in the form of a fiber or in the form of a net in the entire cytoplasm and determines the shape/morphology of a cell. Therefore, if an area in which cytoskeletons are distributed can be accurately extracted, the shape of the area can be regarded as generally indicating the cell shape. Although an actin filament, which is one of main cytoskeletons, can be visualized on a fluorescent image by staining, staining is invasive processing. For this reason, in the cell image analysis method and the cell analysis device according to the present invention, a cell area estimation image is generated from a phase image of a cell by using an algorithm of machine learning, and the shape and the morphology of a cell can be evaluated from the image.

In other words, the cell image analysis method and the cell analysis device according to the above-described aspect of the present invention, when generating a machine learning model by machine learning, a phase image of an appropriate cell and a pseudo cell area image based on a stained image acquired by staining a cytoskeleton of the same cell and observing it by a fluorescence microscope are used. The phase image is acquired by calculation processing based on hologram data, as described above, and is acquired non-invasive to a cell. When observing a cell nucleus of an analysis target cell, a cell area estimation image can be acquired as an output image by using the above-described machine learning model and inputting the phase image acquired for the cell.

In this way, according to the cell image analysis method and the cell analysis device according to the above-described aspect of the present invention, it is possible to acquire a cell area estimation image in which a cell area is clearly exhibited without performing invasive processing such as staining for a cell. With this, the user can grasp the shape and the morphology of the cell. Further, since the imaging (measuring) of a cell, which is an analysis target, can be performed in a non-invasive manner, it is possible to continuously culture the cell after grasping the cell shape or to analyze or observe the cell for other purposes.

BRIEF DESCRIPTION OF THE DRAWINGS

FIG. 7 is a diagram showing a process of a ground truth image used when generating a machine learning model in the cell analysis device of this embodiment. FIG. 7A is an original image of a stained fluorescent image. FIG. 7B is an image after background removal/binarization. FIG. 7C is an image after closing processing.

EMBODIMENTS FOR CARRYING OUT THE INVENTION

Hereinafter, an embodiment of a cell image analysis method and a cell analysis device according to the present invention will be described with reference to the accompanying drawings.

Figure 1:
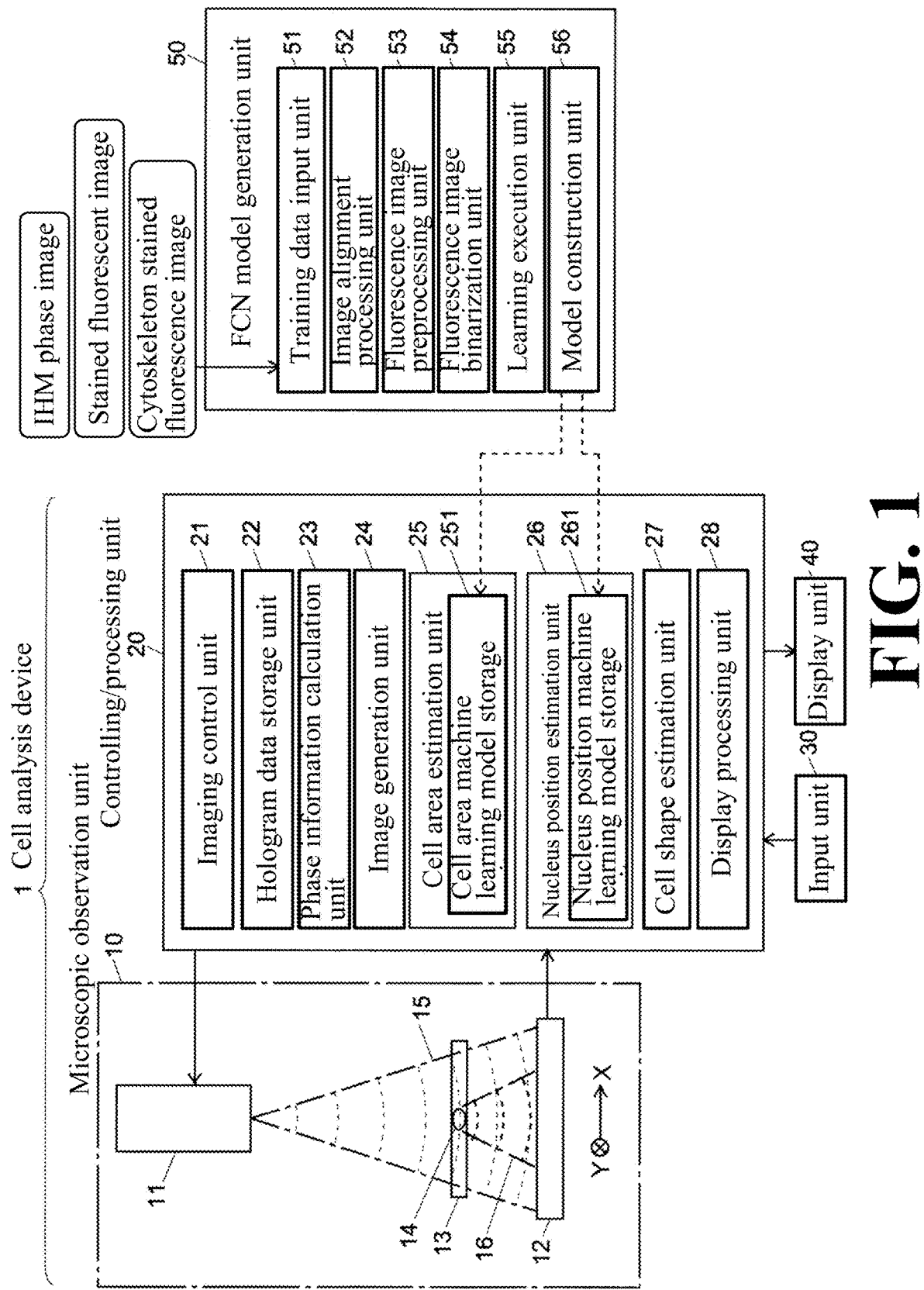
FIG. 1 is a schematic configuration diagram of an embodiment of a cell analysis device using a cell image analysis method according to the present invention.

FIG. 1 is a block configuration diagram of the main part of the cell analysis device which is an embodiment for carrying out the cell image analysis method according to the present invention.

The cell analysis device 1 of this embodiment is provided with a microscopic observation unit 10, a controlling/processing unit 20, an input unit 30 and a display unit 40 which are user interfaces. An FCN model generation unit 50 is provided to the cell analysis device 1.

The microscopic observation unit 10 is in-line holographic microscopy (In-line Holographic Microscopy: IHM), and is provided with a light source unit 11 including a laser diode, etc., and an image sensor 12. A culture plate 13 including a cell 14 is arranged between the light source unit 11 and the image sensor 12.

The controlling/processing unit 20 controls the operation of the microscopic observation unit 10 and processes the data acquired by the microscopic observation unit 10, and is provided with an imaging control unit 21, a hologram data storage unit 22, a phase information calculation unit 23, an image generation unit 24, a cell area estimation unit 25, a nucleus position estimation unit 26, a cell shape estimation unit 27, and a display processing unit 28 as functional blocks. The cell area estimation unit 25 includes a cell area machine learning model storage unit 251, and the nucleus position estimation unit 26 includes a nucleus position machine learning model storage unit 261.

The FCN model generation unit 50 includes a training data input unit 51, an image alignment processing unit 52, a fluorescence image preprocessing unit 53, a fluorescence image binarization unit 54, a learning execution unit 55, and a model construction unit 56 as functional blocks. The learned machine learning model generated by the FCN model generation unit 50 is stored in the storage unit in the controlling/processing unit 20 and functions as the cell area machine learning model storage unit 251 and the nucleus position machine learning model storage unit 261.

Normally, the controlling/processing unit 20 is in fact a personal computer or a more sophisticated workstation on which predetermined software is installed, or a computer system including a high-performance computer connected to such a computer via a communication line. That is, the function of each block included in the controlling/processing unit 20 can be embodied by the processing using various data stored in the computer or the computer system, the data being executed by executing software installed on a single computer or a computer system including a plurality of computers.

The FCN model generation unit 50 is also in fact a personal computer in which predetermined software is installed or a higher performance workstation. Normally, the computer is a computer separate from the controlling/processing unit 20, but may be the same computer. In other words, it may be configured such that the controlling/processing unit 20 has a function of the FCN model generation unit 50.

First, in the cell analysis device 1 of this embodiment, the operations and the processing up to the generation of the IHM phase image, which is an observation image of a cell, will be described.

When the operator sets the culture plate 13 including a cell 14 at a predetermined position and performs predetermined operations with the input unit 30, the imaging control unit 21 controls the microscopic observation unit 10 to acquire hologram data in the following procedures.

That is, the light source unit 11 irradiates a predetermined area of the culture plate 13 with coherent light having an angular spread of about 10°. The coherent light (object light 16) transmitted through the culture plate 13 and the cell 14 reaches the image sensor 12 while interfering with the light (reference light 15) transmitted through the area adjacent to the cell 14 on the culture plate 13. The object light 16 is light whose phase has changed when passing through the cell 14, while the reference light 15 is light which does not undergo a phase change due to the cell 14 because it does not pass through the cell 14. Therefore, on the detection surface (image plane) of the image sensor 12, an image due to interference fringes between the object light 16 whose phase has changed by the cell 14 and the reference light 15 whose phase has not changed, i.e., a hologram, is formed.

The light source unit 11 and the image sensor 12 are sequentially moved in the X-axis direction and in the Y-axis direction in conjunction with each other by a moving mechanism (not shown). With this, the irradiation area (observation area) of the coherent light emitted from the light source unit 11 is moved on the culture plate 13, so that it becomes possible to acquire hologram data (two-dimensional light intensity distribution data of the hologram formed on the detection surface of the image sensor 12) over the wide two-dimensional area.

As described above, the hologram data acquired by the microscopic observation unit 10 is sequentially sent to the controlling/processing unit 20 and stored in the hologram data storage unit 22. In the controlling/processing unit 20, the phase information calculation unit 23 reads the hologram data from the hologram data storage unit 22 and executes predetermined calculation processing for phase restoration to calculate phase information of the entire observation area (imaging area). The image generation unit 24 generates an IHM phase image based on the calculated phase information. At the time of calculating the phase information or generating the IHM phase image, a well-known algorithm disclosed in, e.g., Patent Document 2 can be used.

Figure 8A:
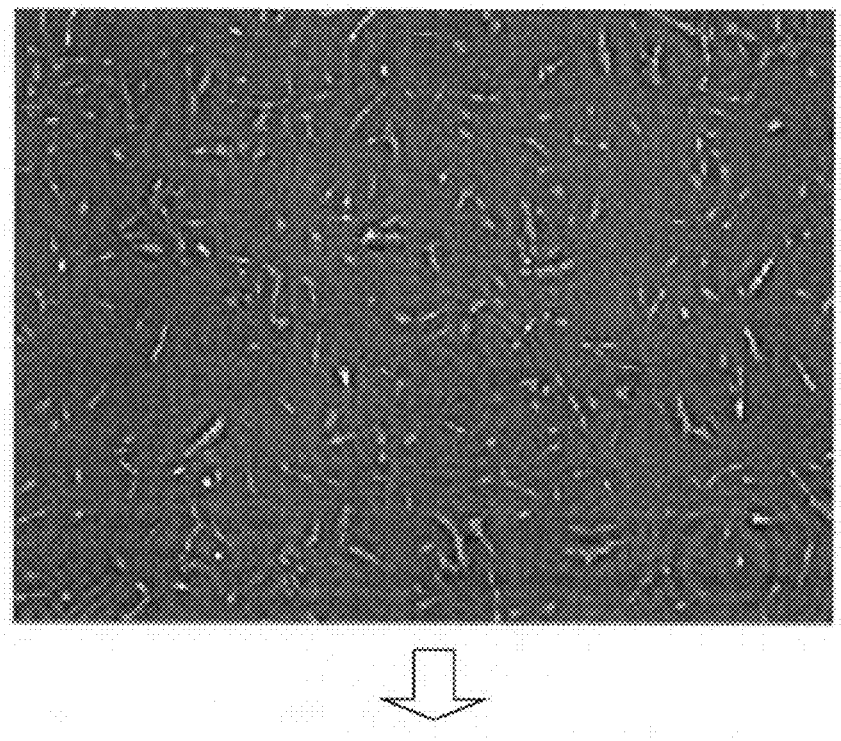
FIG. 8A shows an example of an input image (IHM phase image) of FCN processing in the cell analysis device of this embodiment.
Figure 11A:
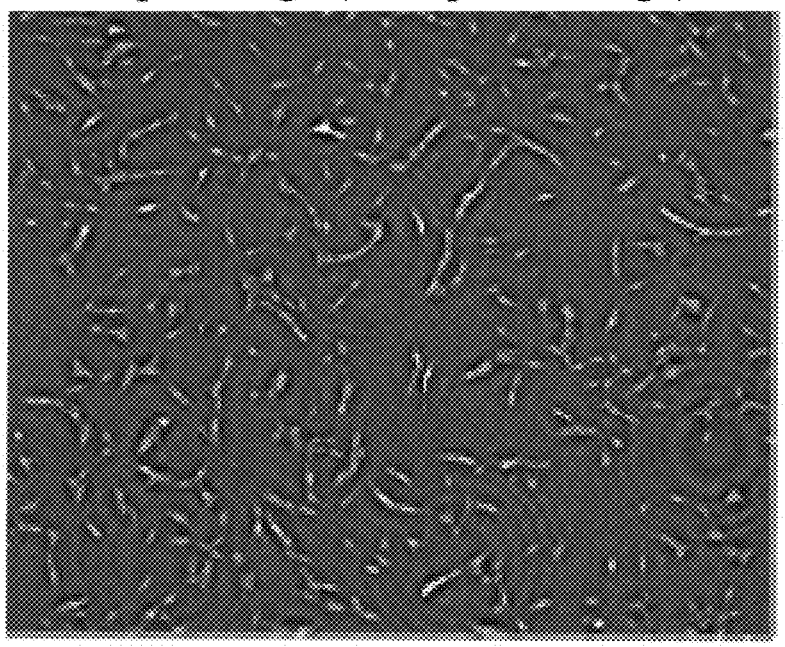
FIG. 11A shows an example of an input image (IHM phase image) of FCN processing in the cell analysis device of this embodiment.

FIG. 8A and FIG. 11A show examples of IHM phase images. It is understood that a cell which is transparent is difficult to be visually recognized under a typical optical microscope, but that individual cells can be observed quite clearly in the IHM phase image. However, it is difficult to accurately grasp the shape of each cell even in the IHM phase image. This is due to the fact that there is almost no difference in pixel value between the inside and the outside of the cell.

Figures 6A, 6B:
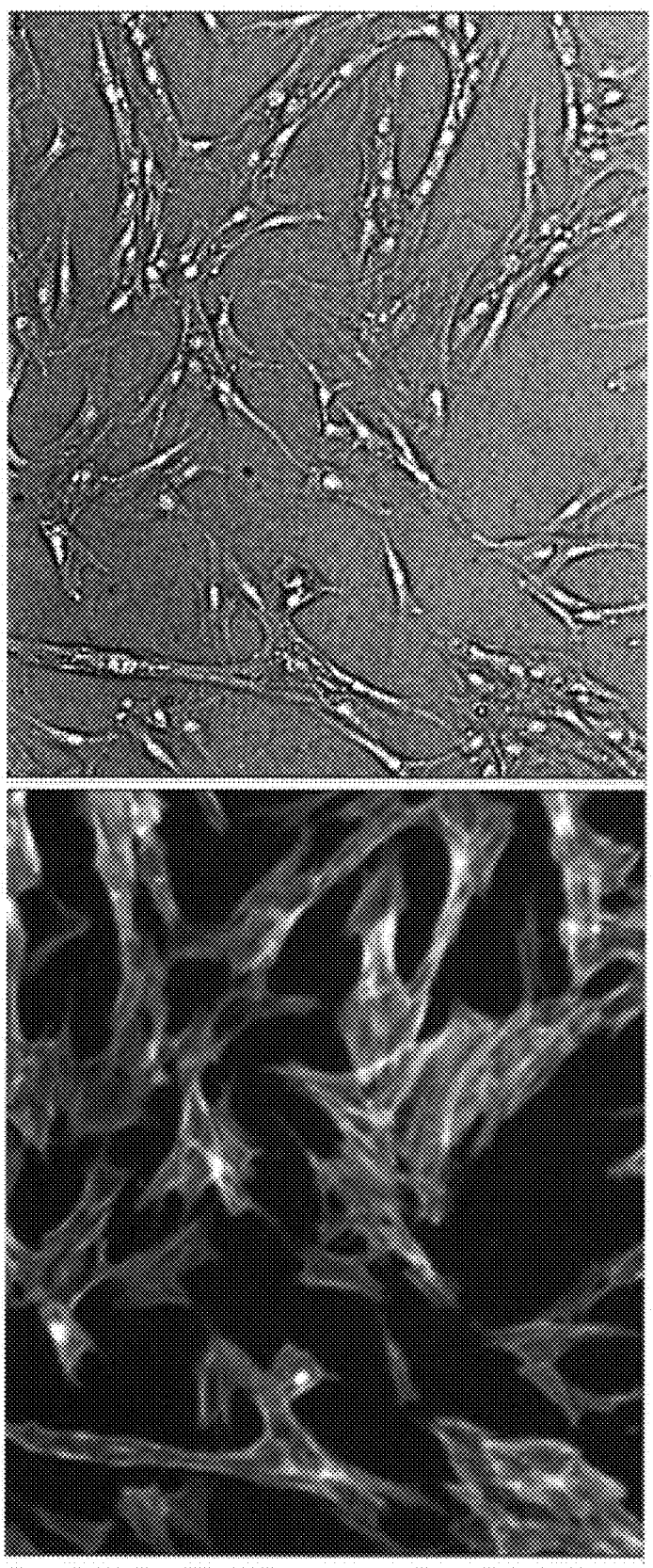
FIG. 6A shows an example of an actin filament stained image.
FIG. 6B shows an example of a bright-field image.

FIG. 6A and FIG. 6B show an actin filament fluorescent stained image and a bright-field image by a conventional microscope in the same area. As shown in FIG. 6A, an actin filament is one kind of cytoskeletons and is present in a fiber shape throughout the entire interior of a cell. As shown in FIG. 6B, although it is difficult to visually recognize the cell area in the bright-field image, it can be seen that the cell exists in the area where actin filaments exist. From this, it can be considered that the area in which actin filaments are distributed is a cell area. Therefore, in the cell analysis device of this embodiment, a machine learning model was generated from the IHM phase image of a mesenchymal stem cell (MSC: Mesenchymal Stem Cells) and a fluorescent image in which the cytoskeleton (actin filaments in this case) of the cell is stained by using a fully convolutional neural network (FCN: Fully Convolutional Neural network) which is one of machine learning methods. And it is configured such that an IHM phase image is used as an input image to acquire a cell area estimation image as an output image using the machine learning model.

Figure 2:
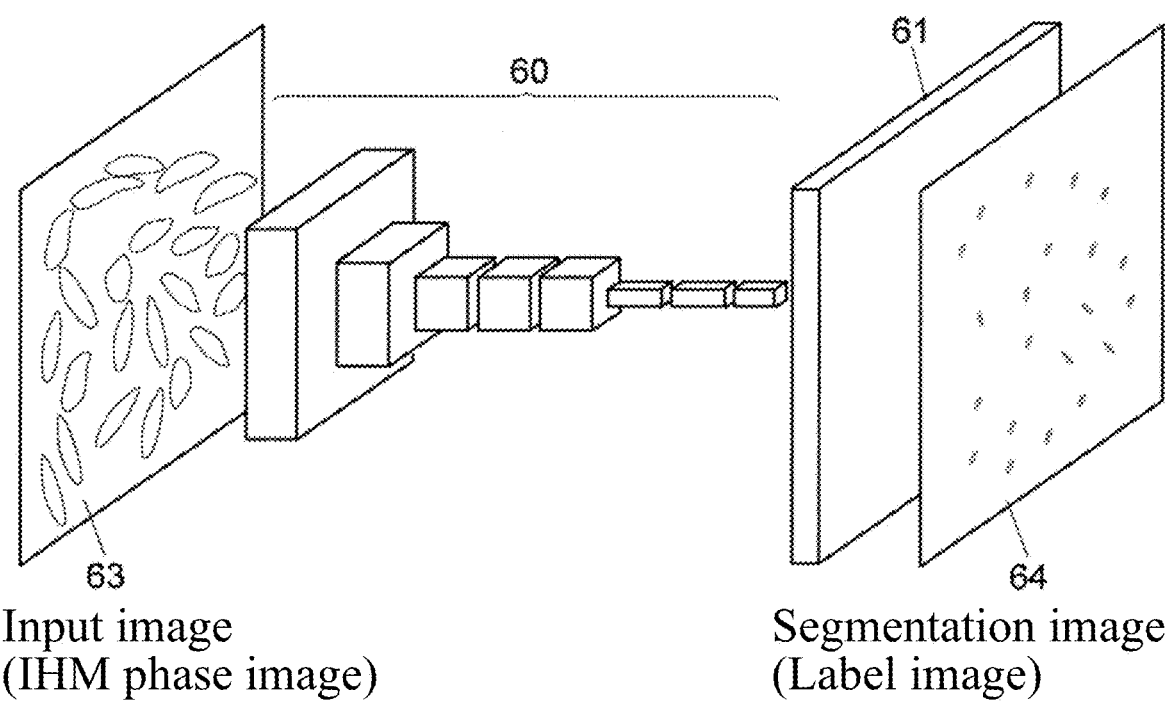
FIG. 2 is a conceptual diagram of a structure of a fully convolutional neural network used in the cell analysis device of this embodiment.

FIG. 2 is a conceptual diagram of the structure of the FCN. The details of the structure and processing of the FCN are described in detail in many documents. It may also be implemented using commercially available or free software such as "MATLAB" provided by MathWorks, USA. For this reason, a schematic description will be given here.

As shown in FIG. 2, an FCN includes, for example, a multi-layer network 60 in which a convolutional layer and a pooling layer are repeatedly multilayered, and a convolutional layer 61 corresponding to all coupling layers in a convolutional neural network. In this instance, in the multi-layer network 60, convolution processing using a filter (kernel) having a predetermined-size and pooling processing for two-dimensionally reducing the convolution results and extracting valid values. Note that the multi-layer network 60 may be configured only by a convolutional layer without pooling layers. In the final stage convolutional layer 61, local convolution and deconvolution are performed while sliding a filter having a predetermined size within the input image. In this FCN, by performing semantic segmentation to the input image 63 such as an IHM phase image, it is possible to output the segmentation image 64 labeled by partitioning the cell area from other areas.

Here, a multi-layer network 60 and a convolutional layer 61 are designed so that labeling is performed on a pixel-by-pixel basis in the IHM phase image to be input. That is, the smallest unit of one area to be labeled in the segmentation image 64, which is an output image, is one pixel on the IHM phase image. Therefore, even if the size of the cell area is about one pixel on the IHM phase image, the cell area is detected as one area in the label image 64.

In order to perform the above-described semantic segmentation using an FCN, it is required to construct a machine learning model by learning coefficients (weightings) of filters in a plurality of convolutional layers and the final convolutional layer 61 included in the multi-layer network 60 by using a large number of learning image data in advance.

Figure 3:
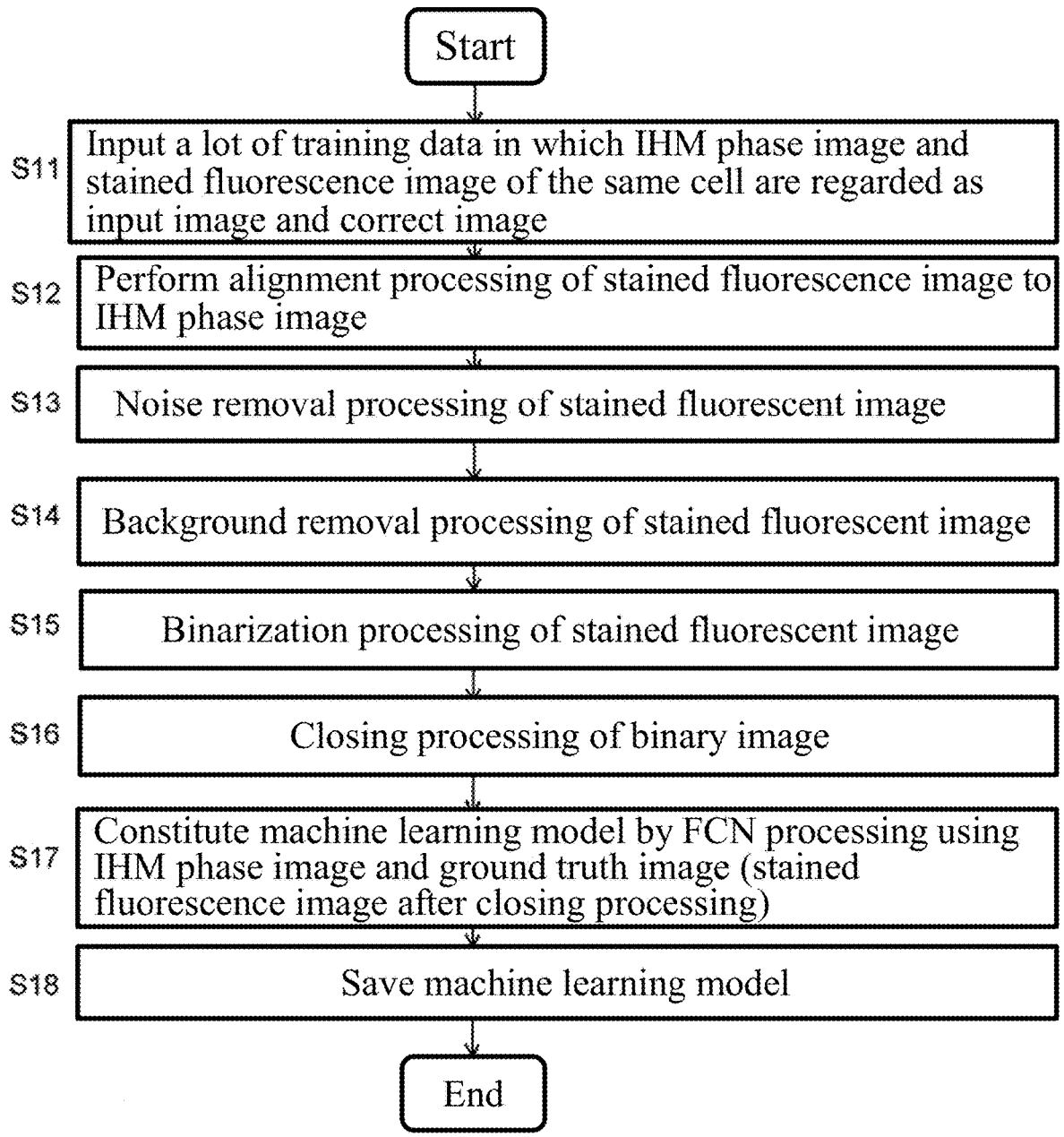
FIG. 3 is a flowchart showing a flow of processing at the time of generating a machine learning model in the cell analysis device of this embodiment.

The operation when performing the learning processing in the FCN model generation unit 50 will be described with reference to the flowchart shown in FIG. 3. Note that at the time of the learning, for example, it is possible to perform learning using the stochastic gradient descent method which is commonly used in machine learning.

The training data input unit 51 of the FCN model generation unit 50 reads in advance a large number of sets of training data (also referred to as teacher data, herein referred to as "training data") in which an IHM phase image generated by the image generation unit 24 and a corresponding ground truth image (strictly speaking, a stained fluorescent image as a source of a ground truth image) constitute a set (Step S11). The IHM phase image is generated based on data acquired by actually imaging a cell in cell analysis device 1 as described above. However, it is not necessarily limited to an image acquired by a particular cell analysis device but may be an image acquired by other cell analysis devices having a similar configuration. On the other hand, the image which becomes a source of the ground truth image is a fluorescent image (cytoskeleton stained fluorescence image) acquired by staining a cytoskeleton (here, actin filament) of a cell when the IHM phase image was generated and capturing the stained image with an appropriate microscope. The staining method is not specifically limited as long as a cytoskeleton can be stained, but phalloidin and the like can be generally used.

It is desirable that the position, the direction, the size, etc., of a cell are exactly the same between a pair of the IHM phase image and the stained fluorescent image. However, generally, since a fluorescent image cannot be acquired in parallel to the imaging with digital holographic microscopy, it is inevitable that the position, the direction, the size, etc., of a cell differ between the IHM phase image and the stained fluorescent image. Therefore, the image alignment processing unit 52 performs image processing, such as, e.g., translating, rotating, enlarging, and reducing one of images to align both the images (Step S12). Generally, it is preferable to perform the image processing so as to align the stained fluorescent image with reference to the IHM phase image in which a cell is more clearly visible. This alignment operation may be performed manually by the operator while referring to, for example, an edge of a well, a mark on a culture plate, or the like, or may be automatically performed with a predetermined algorithm.

Next, the fluorescence image preprocessing unit 53 performs noise removal processing and background removal processing (Steps S13, S14) so that the area of a cell nucleus becomes clearer in a stained fluorescent image. The noise removal processing is intended to remove noise due to disturbances, etc., and various filters, such as a linear filter and a median filter, can be used. Further, the background removal processing is mainly intended to remove uneven intensity in a background portion other than cytoskeletons, and a method using a mean value filter or the like is known as a background subtraction processing. The noise removal processing and the background removal processing may utilize various techniques utilized in conventional image processing.

The fluorescence image binarization unit 54 performs binarization processing on the image subjected to the preprocessing described above to generate a binary image in which the area in which cytoskeletons are distributed and the other areas (Step S15). Further, the fluorescence image binarization unit 54 performs closing processing in which expansion processing and reduction processing are combined on the binarized image (Step S16).

FIG. 7A shows an example of an original image of an actin filament stained fluorescent image. FIG. 7B shows an example of an image after background removal and binarization are performed on the image shown in FIG. 7A. FIG. 7C shows an example of an image after closing processing is performed on the image shown in FIG. 7B. The same can be applied to the images described below, but here, a mesenchymal stem cell (MSC) is a target of an analysis.

Generally, in an actin filament stained fluorescent image, intensity unevenness is large in a background area in which no actin filaments exist, so that binarization capable of accurately extracting an actin filament area cannot be performed unless background removal processing is performed. On the other hand, by performing background removal processing in advance, it is possible to acquire a binary image in which actin filament areas are accurately extracted as shown in FIG. 7B.

Further, as described above, although actin filaments are stretched in a fiber shape inside a cell, they do not necessarily exist uniformly. Even in a cell, there occurs a pixel which is partially black when binarized because actin filaments are not present or its density is low. Therefore, by performing closing processing after binarization, pixels whose surroundings are white are converted to white even if they are black. This makes it possible to acquire an image showing not only the portion where cytoskeletons actually exist but also the range where cytoskeletons are distributed, that is, a cell area. That is, the image after closing processing is an image acquired by dividing the cell area and the other area for each pixel on the corresponding IHM phase image.

When a large number of training data sets each including an IHM phase image and a stained fluorescent image after closing processing are acquired by performing the processing of Steps S12 to S16 for all training data, the learning execution unit 55 performs learning of an FCN by using the large number of training data (Step S17). That is, the learning execution unit learns the filter coefficient at a plurality of convolutional layers in the network so that the result of the semantic segmentation by the FCN processing becomes as close as possible to a ground truth image. The model construction unit 56 constructs a model in the course of repeating the learning, and when the predetermined learning is completed, the model construction unit 56 stores the machine learning model based on the learning result (Step S18).

The data constituting the cell area machine learning model thus generated is stored in the cell area machine learning model storage unit 251 of the cell analysis device 1.

Further, in the cell analysis device 1 of this embodiment, a nucleus position machine learning model for estimating a cell nucleus of each cell in addition to a cell area is generated in the same manner as in a cell area machine learning model. In generating a nucleus position machine learning model, a stained fluorescent image in which a cell nucleus is stained is required as a ground truth image. For staining a cell nucleus, DAPI (4',6-diamidino-2-phenylindole), propidium iodide, SYTOX (registered trademark), TO-PRO (registered trademark)-3, and the like, which are commonly used, can be used. Note that, at the time of generating a nucleus position machine learning model, the processing of Steps S11 to S15 described above is performed on the stained fluorescent image, but the processing of Step S16 is not necessary. The reason for this is that, in a cytoskeleton stained fluorescence image after binarization, pixel omission occurs in a cell area and the pixel needs to be converted from black to white, whereas in a cell nucleus stained image after binarization, the position of a cell nucleus is accurately represented and there is almost no pixel omission.

Figure 4:
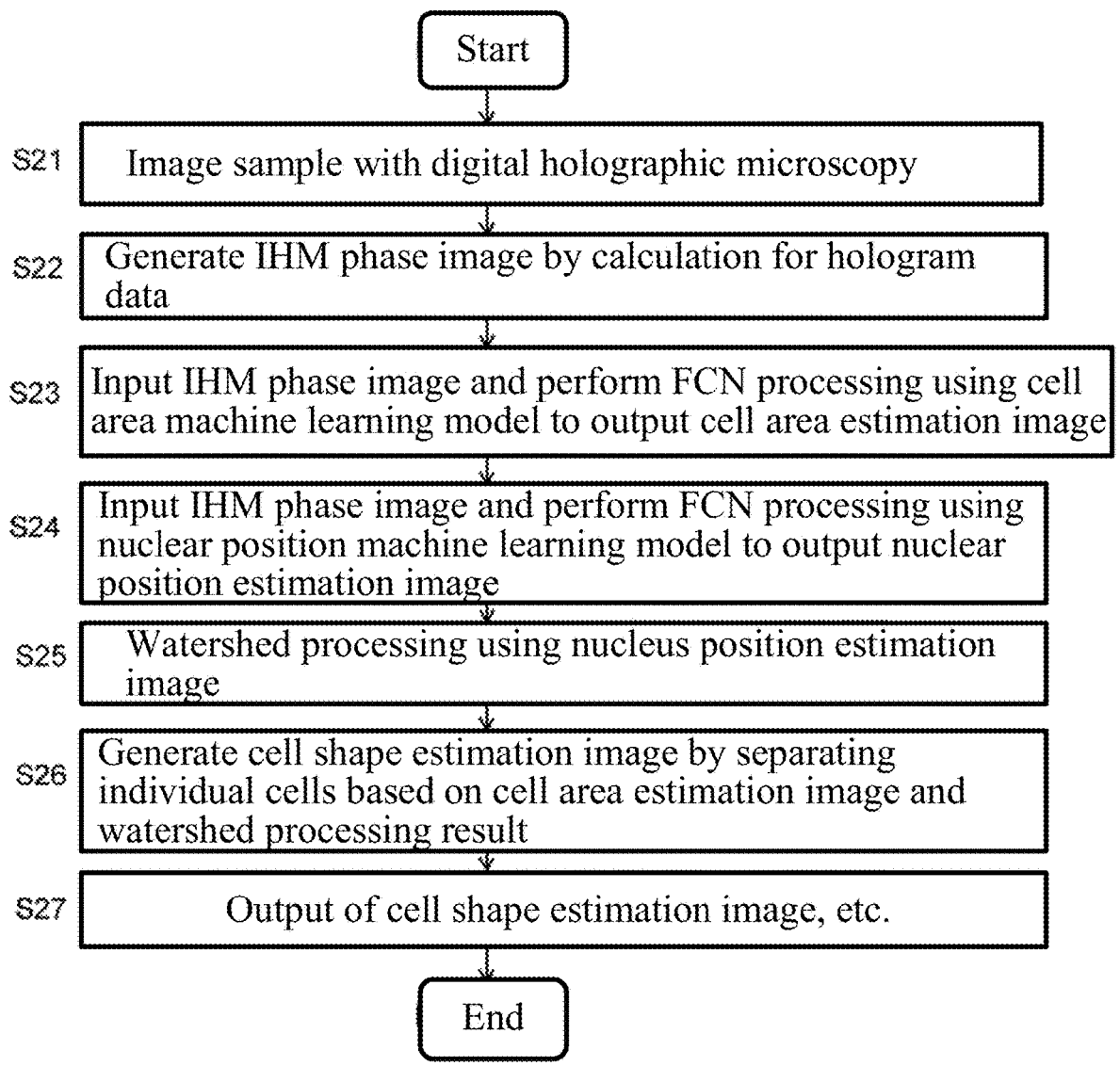
FIG. 4 is a flowchart showing a flow of processing from imaging a cell which is an analysis target to outputting a cell shape estimation image in the cell analysis device of this embodiment.

Next, referring to the flowchart shown in FIG. 4, the processing of generating a cell shape estimation image for a cell, which is an analysis target, performed by the cell analysis device 1 will be described.

The operator sets a culture plate 13 including a cell 14 which is an analysis target at a predetermined position of the microscopic observation unit 10 and performs certain operations by the input unit 30. With this, under the control of the imaging control unit 21, the microscopic observation unit 10 performs imaging of the sample (cell 14 in the culture plate 13) (Step S21). The phase information calculation unit 23 and the image generation unit 24 perform phase calculations based on the hologram data acquired by the imaging to generate an IHM phase image (Step S22).

Thereafter, the cell area estimation unit 25 reads the IHM phase image acquired in Step S22 as an input image, performs processing by the FCN using the cell area machine learning model stored in the cell area machine learning model storage unit 251, and outputs a segmentation image corresponding to the input image (Step S23). The segmentation image at this time is a cell area estimation image showing the cell area and the other background areas in a distinguished manner for the same observation range as the IHM phase image which is an input image.

As is well known, in the FCN processing using the machine learning model constructed by learning as described above, a numerical value indicating the certainty of the semantic segmentation probability is acquired for each pixel. That is, here, the probability of the certainty of the estimation that it is a cell area is acquired for each pixel. Therefore, the cell area estimation unit 25 compares the probability value of each pixel with a predetermined threshold value and outputs a binary segmentation image in which a pixel having a probability value of a threshold value or more is white and the other pixels are black.

Since the cell area machine learning model used at this time is a model capable of performing semantic segmentation of a cell area with high accuracy, it is possible to perform semantic segmentation of a cell area on the IHM phase image for a cell which is an observation target with high accuracy on a pixel-by-pixel basis.

Figure 8B:
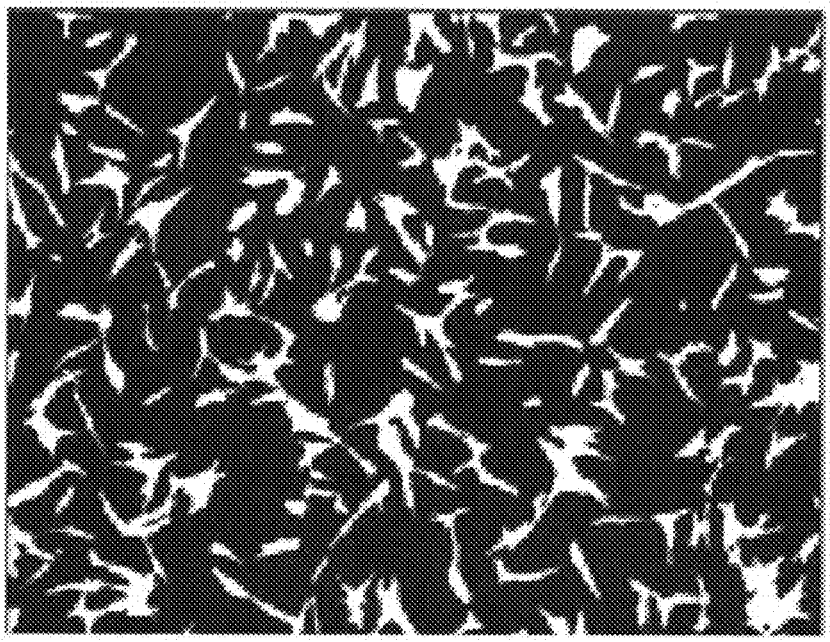
FIG. 8B shows an example of an output image (cell area estimation image) which is a processing result.
Figure 9:
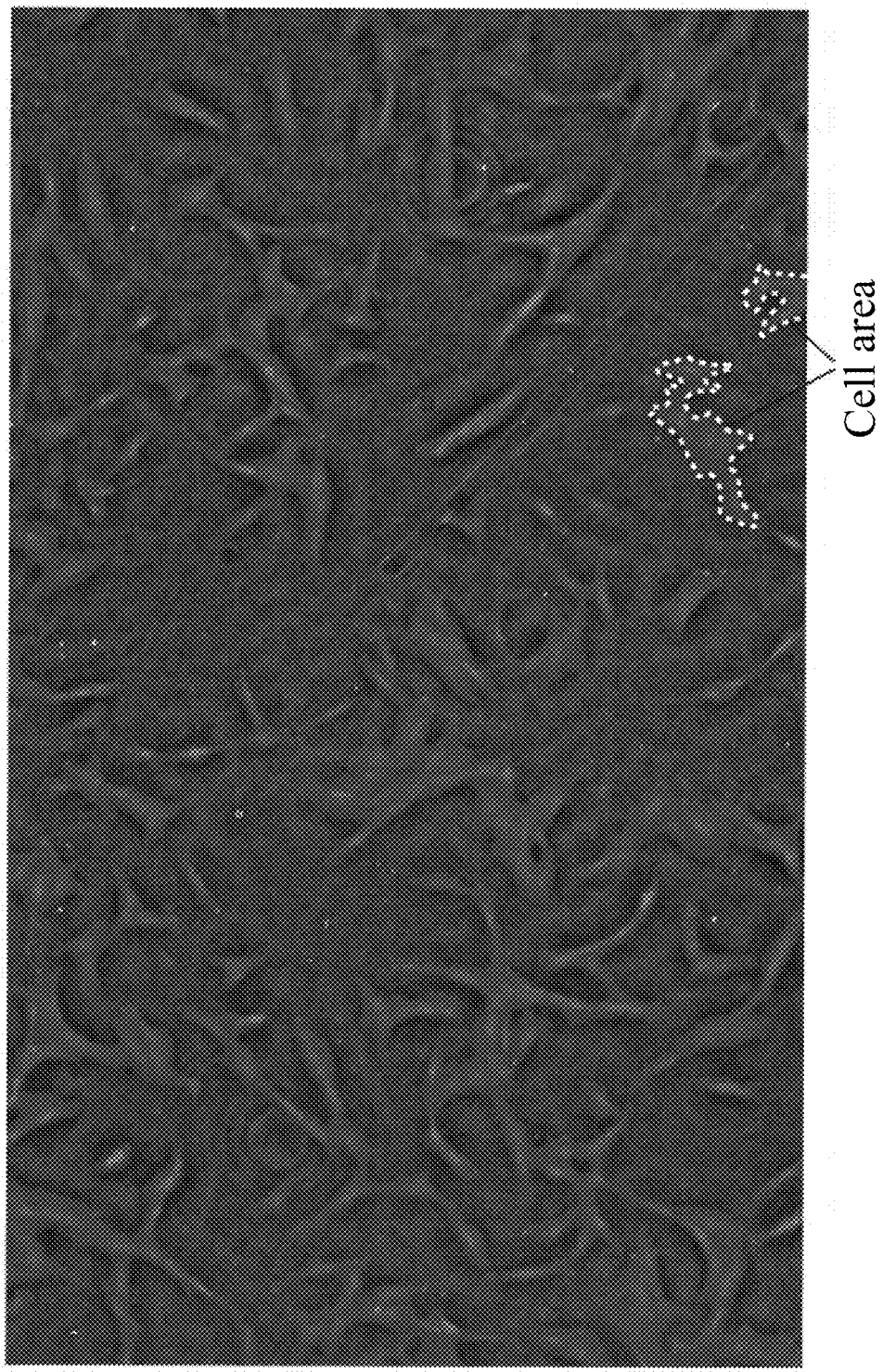
FIG. 9 shows an image in which an input image (IHM phase image) of FCN processing and a cell area estimated from the IHM phase image are overlaid in the cell analysis device of this embodiment.
Figure 10:
FIG. 10 is a ground truth image (image showing a correct cell area) corresponding to the image shown in FIG. 9.

FIG. 8B is an example of a cell area estimation image, i.e., an output image acquired from an IHM phase image shown in FIG. 8A as an input image. FIG. 9 shows an image in which the IHM phase image and the cell area estimated from the IHM phase image are superimposed. Further, FIG. 10 is a ground truth image (image showing correct cell areas) corresponding to the image shown in FIG. 9. Comparing FIG. 9 and FIG. 10, it can be seen that the cell areas are fairly accurately estimated.

Figure 11B:
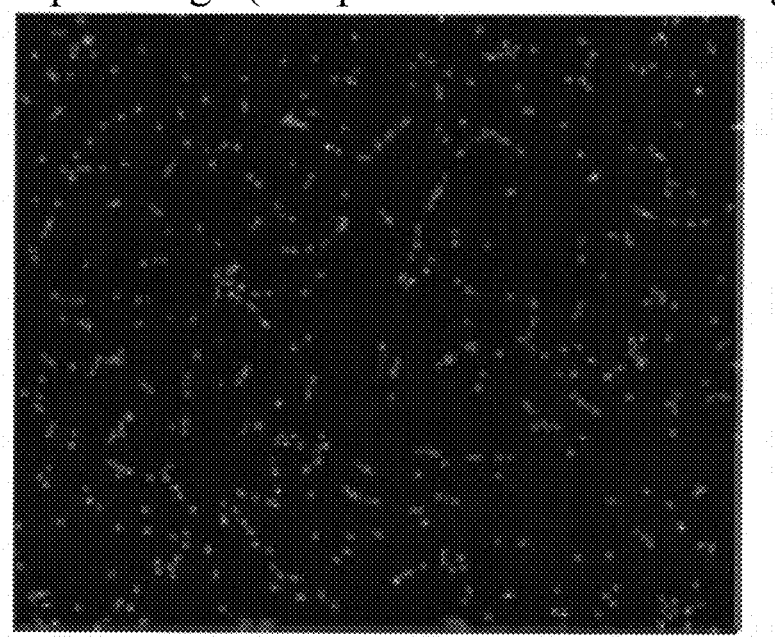
FIG. 11B shows an example of the processing result of an output image (nucleus position estimation image).
Figure 12C:
FIG. 12A to FIG. 12D show an example of each image in the processing of cell area estimation in the cell analysis device of this embodiment.
Figure 12D:
Figure 12A:
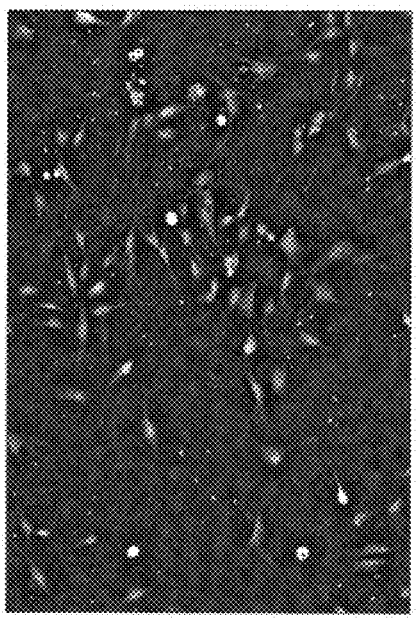
Figure 12B:

Next, the nucleus position estimation unit 26 reads the IHM phase image acquired in Step S22 as an input image, performs processing by the FCN using the nucleus position machine learning model stored in the nucleus position machine learning model storage unit 261, and outputs a segmentation image corresponding to an input image (Step S24). The segmentation image at this time is a nucleus position estimation image showing the cell nucleus area and the other areas in a distinguished manner for in the same observation range as the IHM phase image which is an input image. FIG. 11B is an example of an input image acquired from the IHM phase image shown in FIG. 11A as an output image, i.e., an example of a nucleus position estimation image.

Similar to the cell area estimation image, also at this time, a numerical value indicating the probability of certainty of a segmentation that can be acquired by the FCN processing for each pixel is acquired. In other words, here, it is sufficient to compare the probability value of certainty of the estimation that it is a cell area with a predetermined threshold value and output a binary segmentation image in which a pixel having a probability value of a threshold value or more is white and the other pixels are black.

Further, it may be configured such that a grayscale image indicating the probability value of certainty of the segmentation for each pixel in a gray scale is acquired as an output image and the following maximum value area extraction processing is performed to generate a nucleus position estimation image clearly indicating the candidate point of the nucleus position.

That is, the nucleus position estimation unit 26 first spatially expands the area that is a nucleus other than the black area (background area) in a nucleus position estimation image which is a grayscale image. Then, in the expanded image, by subtracting the offset value determined by considering the noise tolerance in advance from the signal value (brightness value) of each pixel, the brightness is generally reduced. Thereafter, subtraction processing of the brightness value for each pixel is performed between the image before expansion processing and the image after brightness reduction. By performing the subtraction processing of the brightness value for each pixel between the original image before expansion processing and the image after the brightness reduction, regardless of a peak value, the brightness value becomes non-zero in the narrow range near the peak brightness value in the original image and the brightness value becomes zero in the other areas. That is, by this processing, it is possible to extract the area of the maximum value in which the brightness value is higher than the surrounding areas in the original images. Note that the algorithm of the maximum value area extraction processing is common in the image processing, but not limited to this algorithm, and any known method can be used for the maximum value area extraction processing.

After generating an image from which the maximum value area is extracted, the nucleus position estimation unit 26 binarizes the image to generate a nucleus position candidate point image that indicates nucleus position candidates. This nucleus position candidate point image may be used instead of the nucleus position estimation image. If binarization based on a probability value for each pixel is performed without performing the maximum value area extraction processing, for example, a plurality of cell nucleus present in close proximity may sometimes be extracted as one cell nucleus, but by performing the maximum value area extraction processing, the position of each cell nucleus can be specified more accurately.

Figure 5:
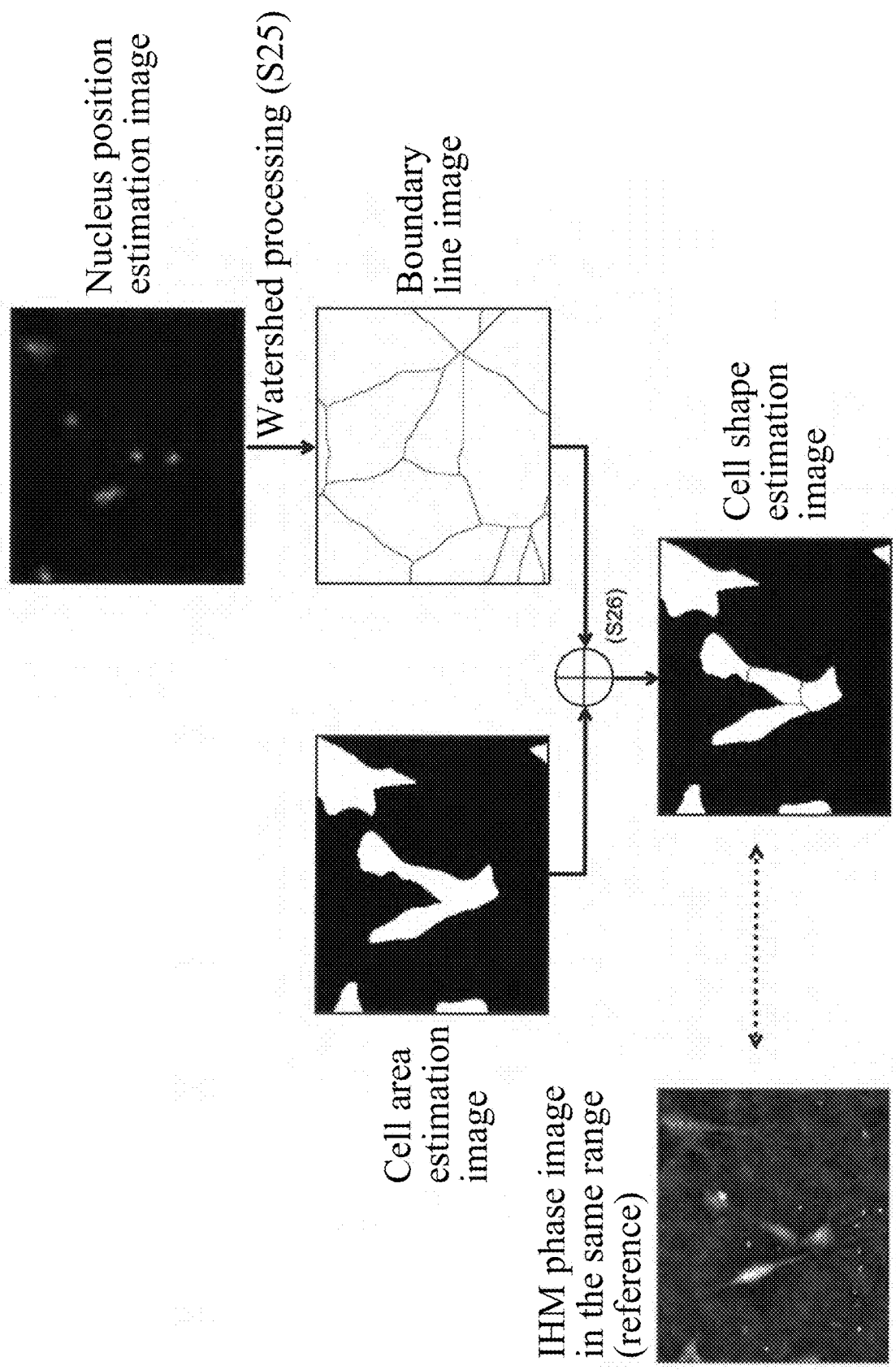
FIG. 5 is an explanatory diagram for calculating a cell shape estimation image from a cell area estimation image and a nucleus area estimation image in the cell analysis device of this embodiment.

Once the cell area estimation image and the nucleus position estimation image are acquired by the cell area estimation unit 25 and the nucleus position estimation unit 26, respectively, the cell shape estimation unit 27 generates a cell shape estimation image as follows. FIG. 5 is an explanatory diagram for calculating a cell shape estimation image from a cell area estimation image and a nucleus area estimation image.

The cell shape estimation unit 27 first performs watershed processing based on the nucleus position estimation image (Step S25). The watershed processing is generally known as image processing known as a watershed algorithm, for example, first the area of the nucleus position in the image is extracted, and then the distance between adjacent areas is acquired to generate an image in which the central of the adjacent areas becomes a valley (becomes dark). Then, the image is subjected to separation processing by watershed processing to be divided into a plurality of areas in which the area of the extracted nucleus is approximately centered, thereby generating a boundary line image in which the border line of the cell is clearly indicated.

As described above, the cell area estimation image is an image in which an area where a cell exists and a background area other than the area are divided. However, when a plurality of cells exists in close contact with each other, the plurality of cells in close contact with each other is depicted as one cell area, and the shape or the morphology of each cell cannot be recognized. Therefore, the cell shape estimation unit 27 separates the respective cell areas on the cell area estimation image into each cell as shown in FIG. 5 based on the cell area estimation image and the boundary line image as a result of the watershed processing to generate a cell shape estimation image in which the shapes (contours) of cells are clarified (Step S26). The display processing unit 28 displays the cell shape estimation image generated in Step S26 on the screen of the display unit 40 (Step S27).

FIG. 12 shows examples of images in the process of estimating cell shapes described above. FIG. 12A is an IHM phase image. FIG. 12B is an image (nucleus position estimation result is overlaid in green) in which the nucleus position estimation result is overlaid (overlaying the nucleus position estimation result in green) on the IHM phase image. FIG. 12C is a cell shape estimation image. FIG. 12D is an image in which the cell area estimation result is overlaid (overlaid the cell area estimation result in yellow) on the IHM phase image. The cell shape estimation image shown in FIG. 12C also clarifies the shape of a cell whose shape cannot be clearly understood on the IHM phase image. In addition, in the overlaid image shown in FIG. 12D, the cell area can be clearly grasped by the IHM phase image.

In this manner, in the cell analysis device of this embodiment, by displaying the cell shape estimation image in which the shape and the morphology of each cell are clarified on the display unit 40, it becomes possible to perform a non-invasive shape observation of a raw cell, and therefore the cell used for the observation can be subsequently cultured or used for other purposes.

Further, from the cell area estimation image, the entire area in which cells exist within the imaging range can be known. Therefore, the cell shape estimation unit 27 can calculate the area of the entire cell, calculate the ratio of the cell area to the area of the entire imaging area, and further calculate information about, e.g., the area, the length, or the perimeter, etc., of each cell to calculate statistical information, such as, e.g., the mean value, the median value, and the variance of each cell. It is also possible to perform the process control and/or the quality control in cell cultures by using the information about the morphology of the individual cells.

Note that in the above-described embodiment, although an FCN is used as a machine learning method for the semantic segmentation of the cell area and the cell nucleus, it is obvious to use a normal convolutional neural network. Further, not only a machine learning method using a neural network but also various methods can be applied to the present invention as long as it is a machine learning method capable of performing a semantic segmentation of an image. As such a machine learning method, support vector machines, random forests, and AdaBoost can be exemplified.

Further, in the cell analysis device of the above-described embodiment, although in-line holographic microscopy is used as the microscopic observation unit 10, as long as it is a microscope capable of acquiring a hologram, it is naturally replaceable with other types of holographic microscopy, such as, e.g., an off-axis (off-axis) type and a phase shift type.

Further note that the above-described embodiment and various modifications are merely examples of the present invention, and it is obvious that they are included in the claims of the present application even if the modifications, changes, and additions are made as appropriate within the scope of the present invention.

Various Embodiments

It is apparent to those skilled in the art that the above-described exemplary embodiments are specific examples of the following aspects.

(Item 1) According to one aspect of the cell image analysis method of the present invention, a cell image analysis method includes:
  a machine learning model generation step for generating a machine learning model by performing machine learning using training data including a phase image of a cell for an input image of the machine learning and a pseudo cell area image for a ground truth, the phase image being generated based on hologram data acquired by holographic microscopy, the pseudo cell area image corresponding to the phase image, the pseudo cell image being based on a stained image acquired by staining cytoskeletons; and
  an area estimation step for outputting a cell area estimation image indicating a cell area using the machine learning model, wherein a phase image for an analysis target cell is used as an input image.

(Item 8) Further, according to one aspect of the cell analysis device of the present invention, a cell analysis device includes:
  a holographic microscope;
  an image generation unit configured to generate a phase image of a cell based on hologram data acquired by observing the cell with the holographic microscope;
  a first machine learning model storage unit configured to store a cell area machine leaning model generated by performing machine learning using training data including a phase image of a cell for an input image and a pseudo cell area image for a ground truth image, the phase image being generated based on hologram data, the pseudo cell area image corresponding to the phase image, and the pseudo cell area image being based on a stained image acquired by staining cytoskeletons; and
  a cell area estimation unit configured to output a cell area estimation image indicating a cell area using a cell area machine learning model stored in the first machine learning model storage unit, wherein a phase image generated by the image generation unit for an analysis target cell is used as an input image.

According to the cell image analysis method described in Item 1 and the cell analysis device described in Item 8, it is possible to acquire an image showing an area of a cell which is an observation target, that is, an image in which the border between the inside of the cell and the outside of the cell is clearly shown in a non-invasive manner. Therefore, it becomes easy for the user to observe a shape and a morphology of a cell. Further, the cell after observation of the cell shape and the like can be continuously cultured or can be analyzed or observed for other purposes. Furthermore, even in the case of acquiring an observation image of a wider range to same extent, even if the range of the observation target is wider to some extent, the imaging by the holographic microscopy can be completed only in a short time, and a wide range of a phase image can be reconstructed by calculation processing by a computer after imaging. Therefore, it is possible to satisfactorily observe and analyze the shape and the morphology of the cell existing in a wide range in the container such as a well, without taking a long time for imaging, that is, while suppressing the effect of imaging on a raw cell.

(Item 2)

In the cell image analysis method as recited in Item 1, it may be configured such that in the machine learning model generation step, in addition to a cell area machine learning model based on the training data including the pseudo cell area image for a ground truth image, a nucleus position machine learning model is generated by performing machine learning using training data including a phase image of a cell for an input image and a pseudo nucleus position image for a ground truth image, the pseudo cell area image corresponding to the phase image, the pseudo cell area image being based on a stained image acquired by staining a cell nucleus;

in the area estimation step, the cell area estimation image is output using the cell area machine learning model, and the cell image analysis method further comprises:

a nucleus position estimation step for outputting a nucleus position estimation image indicating a position of the cell nucleus using the nucleus position machine learning model, wherein the phase image on an analysis target cell is used as an input image; and a cell shape estimation step for estimating a boundary of each cell based on the nucleus position estimation image to acquire a cell shape estimation image in which respective cells are shown in a separated manner from information on the boundary of the cell and the cell area estimation image.

(Item 9)

Further in the cell analysis device as described in Item 8, the cell analysis device may further include:

a second machine learning model storage unit configured to store a nucleus position machine leaning model generated by performing machine learning using training data including a phase image of a cell for an input image of the machine learning and a pseudo cell position image for a ground truth, the phase image being generated based on hologram data, the pseudo cell position image corresponding to the phase image, and the pseudo cell position image being based on a stained image acquired by staining a cell nucleus;

a nucleus position estimation unit configured to output a nucleus position estimation image indicating a nucleus position using a nucleus position machine learning model stored in the second machine learning model storage unit, wherein the phase image generated by the image generation unit for an analysis target cell is used as an input image; and a cell shape estimation unit configured to estimate a boundary of each cell based on the nucleus position estimation image to acquire a cell shape estimation image in which respective cells are shown in a separated manner from information of the boundary of the cell and the cell area estimation image.

In the cell image analysis method described in Item 2 and the cell analysis device described in Item 9, similarly to the estimation of the cell area, a nucleus position estimation image in which the position of the cell nucleus is estimated is generated by using a machine learning method. Except for some exceptional cells, a single cell usually has a single nucleus. A nucleus position estimation image clearly indicates the position of the cell nucleus. Normally, in a nucleus position estimation image, the division of the nuclei of a plurality of adjacent cells is also clear. In cases where a plurality of cells is present in close contact with each other, a plurality of cells, which are in close contact with each other, may be depicted as a single cell area in the above-described cell area estimation image. In this case, it is difficult to grasp the shape and the morphology of each cell. On the other hand, since the position of the cell nucleus corresponding to each cell can be grasped in the nucleus position estimation image, the boundary line for dividing the adjacent cells can be estimated based on the nucleus position, and the single cell area can be divided into each cell by using the boundary line.

As described above, according to the cell image analysis method described in Item 2 and the cell analysis device described in Item 9, even in cases where a plurality of cells is closely adhered or accumulated due to the high-density cell or the like, the shape and the morphology of each cell can be observed in a non-invasive manner. As a result, information about, e.g., the area and the perimeter of each cell can be acquired, and information useful for managing the culture condition and the like, checking the condition of the cell, and the like can be acquired.

(Item 10)

Further, in the cell analysis device as recited in Item 8 or 9, the cell analysis device may further include:

a machine learning model generation unit configured to generate a machine learning model by performing machine learning using training data including the phase image of the cell for an input image and a pseudo area image for a ground truth image, the pseudo area image corresponding to the phase image, and the pseudo area image being based on a stained image.

That is, the cell analysis device described in Item 8 does not need to have the function of generating a machine learning model used for acquiring the cell area estimation image from the phase image of the cell, but the cell analysis device described in Item 10 has the function. Therefore, according to the cell analysis device described in Item 10, it is possible to easily improve the machine learning model, for example, a reconstruction of the leaning model by adding the cell area estimation image acquired for the phase image of the cell which is an analysis target in the cell area estimation unit to the training data.

(Item 3)

In the cell image analysis method as recited in Item 1 or 2, it may be configured such that in the machine learning model generation step, alignment processing of the phase image and the stained image of the cell and background removal processing of the stained image are performed.

(Item 11)

In the cell analysis device as recited in Item 10, it may be configured such that the machine learning model generation unit performs alignment processing of the phase image and the stained image of the cell and background removal processing of the stained image.

According to the cell image analysis method described in Item 3 and the cell analysis device described in Item 11, even in cases where the magnification ratio and the position of the phase image and the stained image are not matched due to the reasons that the imaging of the stained image and the imaging by the holographic microscopy cannot be performed simultaneously, the alignment of the same cell can be performed in the phase image and the stained image by the alignment processing. With this, the pixels on the phase image and the pixels on the stained image can be associated one-to-one to generate a machine learning model that can accurately perform semantic segmentation of the phase image. Further, in a stained image acquired by a microscope or the like, uneven intensity of a background cannot be avoided, but by performing the background removal processing, the effect of uneven strength of a background portion can be normally eliminated. This also makes it possible to generate a machine learning model that can accurately perform the semantic segmentation of the phase image.

(Item 4)

In the cell image analysis method as recited in Item 3, it may be configured such that in the machine learning model generation step, binarization processing and closing processing are performed on the stained image after the background removal processing.

(Item 12)

In the cell analysis device as recited in Item 11, it may be configured such that the machine learning model generation unit performs binarization processing and closing processing on the stained image after the background removal processing.

Cytoskeletons such as actin filaments are fibrously stretched around the inside of a cell, but it is not necessarily uniformly present, and even in a cell, when simply binarized because of the absence of cytoskeletons or their low densities, a pixel which becomes partially black is generated. On the other hand, according to the cell image analysis method described in Item 4 and the cell analysis device described in Item 12, by performing the closing processing after the binarization, it is possible to assuredly acquire not only the portion where cytoskeletons actually exist but also the range where cytoskeletons are distributed, that is, the image showing the cell area.

(Item 5)

In the cell image analysis method as recited in any one of Items 1 to 4, it may be configured such that the machine learning uses a fully convolutional neural network.

(Item 13)

In the cell analysis device as recited in any one of Items 8 to 12, it may be configured such that the machine learning uses a fully convolutional neural network.

According to the cell image analysis method described in Item 5 and the cell analysis device described in Item 13, it is possible to accurately indicate the cell area on a pixel-by-pixel basis.

(Item 7)

In the cell image analysis method as recited in Item 2, it may be configured such that in the cell shape estimation step, information on one of an area, a perimeter, and a length of each cell is acquired by using the cell shape estimation image.

(Item 14)

In the cell analysis device as recited in Item 9, it may be configured such that the cell shape estimation unit acquires information on one of an area, a perimeter, and a length of each cell using the cell shape estimation image.

According to the cell image analysis method described in Item 7 and the cell analysis device described in Item 14, even in a state in which a plurality of cells is in close contact with each other, it is possible to provide the user with information about the area, the perimeter, the length, etc., of each cell.

Note that, although the type of a cell as an analysis target is not particularly limited, it is useful for an application in which a cell shape or a morphology needs to be observed in a non-invasive manner or a cell area or the like needs to be calculated, and typically, a target thereof is a mesenchymal stem cell (Item 6)

In the cell image analysis method as recited in any one of Items 1 to 5, it may be configured such that the analysis target cell is a stem cell including a mesenchymal stem cell.

DESCRIPTION OF SYMBOLS

1: Cell analysis device
10: Microscopic observation unit
11: Light source unit
12: Image sensor
13: Culture plate
14: Cell
15: Reference light
16: Object light
20: Controlling/processing unit
21: Imaging control unit
22: Hologram data storage unit
23: Phase information calculation unit
24: Image generation unit
25: Cell area estimation unit
251: Cell area machine learning model storage unit
26: Nucleus position estimation unit
261: Nucleus position machine learning model storage unit
27: Cell shape estimation unit
30: Input unit
40: Display unit
50: FCN model generation unit
51: Training data input unit
52: Image alignment processing unit
53: Fluorescence image preprocessing unit
54: Fluorescence image binarization unit
55: Learning execution unit
56: Model construction unit
60: Multi-layer network
61: Convolutional layer
63: Input image
64: Segmentation image

The invention claimed is:

1. A cell image analysis method comprising:
obtaining a first phase image of a first cell having a cell organelle based on hologram data acquired by holographic microscopy;
staining the first cell;
obtaining a stained cell organelle image of the first cell acquired by microscopy;
generating a first learned model using training data including the first phase image as an input image of machine learning and the stained cell organelle image as a ground truth image; and
inputting a second phase image of a second cell into the first learned model to obtain an estimated cell area image,
wherein the first phase image and the second phase image are not stained.

2. The cell image analysis method as recited in claim 1, further comprising:
obtaining a stained cell nucleus image of the first cell acquired by staining a cell nucleus;

generating a second learned model using the training data including the first phase image of the first cell as an input image and the stained cell nucleus image as the ground truth image;

inputting the second phase image of the second cell into the second learned model to obtain an estimated cell nucleus image indicating a position of the cell nucleus; and estimating a boundary of each cell based on the estimated cell nucleus image to acquire an estimated cell shape image in which respective cells are shown in a separated manner based on the boundary of the cell and the estimated cell area image.

3. The cell image analysis method as recited in claim 1, wherein alignment processing of the first phase image and the stained cell organelle image of the first cell and background removal processing of the stained cytoskeletons cell organelle image are performed.

4. The cell image analysis method as recited in claim 3, wherein binarization processing and closing processing are performed on the stained cell organelle image after the background removal processing.

5. The cell image analysis method as recited in claim 1, wherein the first learned model is generated using a fully convolutional neural network.

6. The cell image analysis method as recited in claim 1, wherein the second cell is a stem cell including a mesenchymal stem cell.

7. The cell image analysis method as recited in claim 2, wherein information on one of an area, a perimeter, and a length of each cell is acquired by using the estimated cell shape image.

8. A cell analysis device comprising:

a holographic microscope;

an image generation unit configured to generate a phase image of a cell based on hologram data acquired by observing the cell with the holographic microscope; and a first computer configured to:
 store a first learned model generated using training data including a first phase image of a first cell having a cell organelle as an input image and a stained cell organelle image of the first cell as a ground truth image, the first phase image being generated based on the hologram data, the stained cell organelle image corresponding to the phase image, and the stained cell organelle image being acquired by staining the cell organelle, and
 output an estimated cell area image using the first learned model stored in the first computer, wherein a second phase image of a second cell generated by the image generation unit is used as an input image, wherein the first phase image and the second phase image are not stained.

9. The cell analysis device as described in claim 8, wherein the first computer is further configured to:
 store a second learned model generated using training data including the first phase image of the first cell as an input image of a machine learning and a stained cell nucleus image as a ground truth image, the stained cell nucleus image being obtained by staining a cell nucleus,
 output an estimated cell nucleus image of the second cell indicating a nucleus position using the second learned model stored in the first computer, wherein the second phase image of the second cell generated by the image generation unit is used as an input image, and
 estimate a boundary of each cell based on the estimated cell nucleus image to acquire an estimated cell shape image in which respective cells are shown in a separated manner based on the boundary of the second cell and the estimated cell area image.

10. The cell analysis device as recited in claim 8, further comprising:
 a second computer configured to generate a learned model using the training data including the first phase image of the first cell as an input image and the stained cell organelle image of the first cell as a ground truth image.

11. The cell analysis device as recited in claim 10, wherein the second computer performs alignment processing of the first phase image and the stained cell organelle image of the first cell and background removal processing of the stained cell organelle image.

12. The cell analysis device as recited in claim 11, wherein the second computer performs binarization processing and closing processing on the stained cytoskeletons-cell organelle image after the background removal processing.

13. The cell analysis device as recited in claim 8, wherein the first learned model is generating using a fully convolutional neural network.

14. The cell analysis device as recited in claim 9, wherein the first computer acquires information on one of an area, a perimeter, and a length of each cell using the estimated cell shape image.

* * * * *